United States Patent [19]

Takayama

[11] Patent Number: 5,433,513
[45] Date of Patent: Jul. 18, 1995

[54] ANTI-SKID CONTROL DEVICE FOR VEHICLES

[75] Inventor: Toshio Takayama, Yamanashi, Japan

[73] Assignee: Tokico Ltd., Kanagawa, Japan

[21] Appl. No.: 235,194

[22] Filed: Apr. 29, 1994

Related U.S. Application Data

[63] Continuation of Ser. No. 896,168, Jun. 10, 1992, abandoned.

[30] Foreign Application Priority Data

Jun. 17, 1991 [JP] Japan .................................. 3-144995
Oct. 11, 1991 [JP] Japan .................................. 3-264155

[51] Int. Cl.$^6$ .............................................. B60T 8/64
[52] U.S. Cl. .................................... 303/111; 303/100; 364/426.02
[58] Field of Search ............... 303/100, 109, 110, 111; 364/426.02, 426.03; 180/197, 233

[56] References Cited

U.S. PATENT DOCUMENTS

| 4,729,608 | 3/1988 | Fennel et al. | 303/109 X |
| 4,735,279 | 4/1988 | Sato | 303/111 |
| 4,746,173 | 5/1988 | Fennel et al. | 303/100 |
| 4,943,922 | 7/1990 | Tanaka | 364/426.02 |
| 5,083,631 | 1/1992 | Nakayama et al. | 364/426.03 |

FOREIGN PATENT DOCUMENTS

249556  10/1989  Japan ............................. 364/426.02

Primary Examiner—Robert J. Oberleitner
Assistant Examiner—Kevin D. Rutherford
Attorney, Agent, or Firm—Biebel & French

[57] ABSTRACT

The controller in tills anti-skid control apparatus sets the brake pressure of the oil cylinder of one wheel to one of the hydraulic pressure reduction mode and the hydraulic pressure holding mode when the one wheel has been judged to be showing an increasing speed and when the pair of wheels in which the one wheel is not included has been judged to show an increasing slippage in condition that the controller does not detect the slip of each wheel.

3 Claims, 7 Drawing Sheets

ANTI-SKID CONTROL DEVICE FOR VEHICLES

This is a continuation of Ser. No. 07/896,168 filed Jun. 10, 1992 now abandoned.

BACKGROUND OF THE INVENTION

1. Field of the Invention

The present invention relates to a technology for use in 4-wheel drive vehicles and, more specifically, is related to an anti-skid control apparatus for vehicle braking system which effectively resolves a condition which sometimes arises when the brakes of a vehicle are quickly or sharply applied, namely the slipping and locking of the vehicle wheels.

2. Background Art

In recent years it has become common for anti-skid control apparatus for vehicle braking systems to be installed in vehicles.

An anti-skid control apparatus for vehicle braking system is an apparatus to effectively resolve the condition wherein the wheels of a vehicle have skidded and locked following the application of the brake pedal by the driver.

Additionally, in the case where, (1) following application of the brake pedal, the speed of the vehicle's wheels falls below a set value (hereinafter referred to as the simulation speed) with respect to the speed of the vehicle body, which is inferred from the speed of the wheels, the anti-skid control apparatus for vehicle braking system reduces the brake pressure to each wheel, or in the case where, (2) the rate of deceleration of the wheels exceeds a set value, and slipping occurs, the anti-skid apparatus for vehicle braking system reduces the brake pressure to each of the vehicle wheels.

The technique of simultaneous control of the left and right wheels through the so-called select-low, select-high controls is known as well.

Figure 5A:
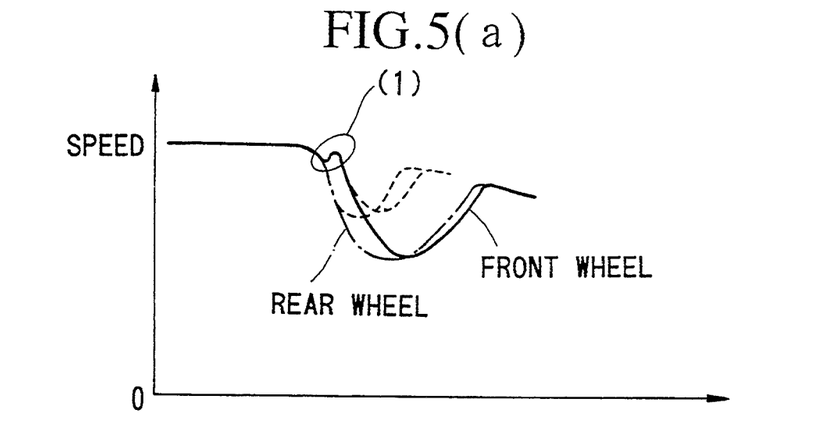

In a 4-wheel drive vehicle where the allowable rotating difference in the space between the front and rear wheels is small, when the brake pedal is applied, due to the disproportionate effect of the drive system on the front and back wheels, and in particular on a road surface having a small friction coefficient L-µ, as shown by (1) in FIG. 5a, the speed of the front wheels may temporarily increase (a phenomena arising from the rebounding of a drive system having been activated by the brakes).

Figure 5B:
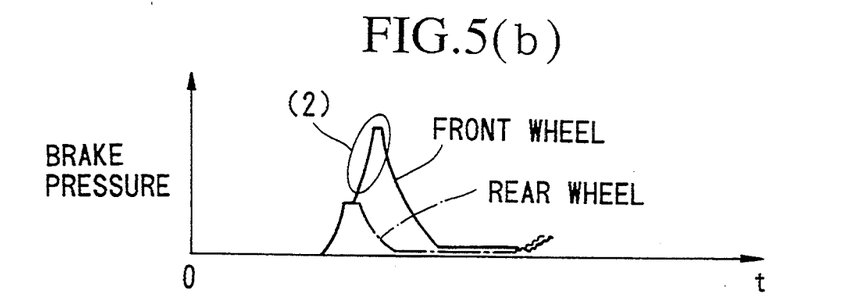
Figure 5C:
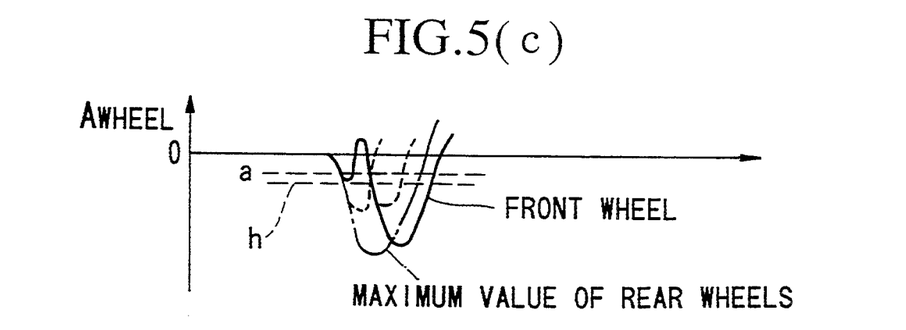

As a result, a problem arises in that the brake pressure to the front wheel increases, as is shown by (2) in FIG. 5b, and, following this and as is shown by the dashed and solid lines in FIG. 5c, a deeper slippage (wheel lock) results in the four wheels together, resulting in an instability in the vehicle.

Please note that for clarity's sake, one wheel only from each of the pair of front wheels and rear wheels is shown in FIG. 5.

SUMMARY OF THE INVENTION

The present invention was conceived taking into account the above factors and has as its objective the provision of an anti-skid control apparatus for vehicle braking system which inhibits the wheels of a vehicle from entering a deep slippage (wheel lock) due to the temporary increase in the speed of the front wheels (or back wheels) which is generated following the application of the brakes, thereby making it possible to operate a vehicle safely and stably.

Further, in order to fulfil the above stated objective, the anti-skid apparatus for vehicle braking system of the present invention comprises the following (A)-(C) and (D)-(F).

In other words, the present invention comprises, (A) an adjustable modulator provided with a hydraulic pressure increase mode for increasing the hydraulic pressure to the oil cylinder of the left and right, and front and rear four wheels, with a hydraulic pressure holding mode for holding as is the current value of the hydraulic brake pressure, and further provided with a hydraulic pressure reduction mode for reducing the hydraulic brake pressure to the oil cylinder of left and right, and front and rear four wheels;

(B) a detection means for detecting the speed of the left and right, and front and rear four wheels of the vehicle;

(C) and a controller which controls the modulator by evaluating a signal output from the aforementioned detecting means, and which selects and sets either the hydraulic pressure increase mode, the hydraulic pressure holding mode or the hydraulic pressure reduction mode for each wheel;

and the aforementioned controller being equipped with, (D) a first judging means for judging whether or not the speed of at least one of the four wheels is tending to increase, this judgement being rendered based on the data output from the detection means;

(E) a second judging means for judging whether or not at least one set out of the pair of front wheels and the pair of rear wheels is showing an increasing slippage;

(F) and with a first setting means which sets the brake pressure of the oil cylinder of the wheel which has been judged by the first judging means to be have an increasing speed to one of either the hydraulic pressure reduction mode or the hydraulic pressure holding mode when one wheel has been judged by the first judging means to be showing an increasing speed and when the pair of front wheels or back wheels in which the aforementioned one wheel is not included has been judged by the second judging means to show an increasing slippage.

Further, according to the structures of the above (A)-(F):

in the first judging means, judgement is rendered as to whether or not the speed of at least one of the four wheels of the vehicle is increasing;

in the second judging means, when an increasing speed is noted in one of the front wheels, judgement is rendered as to whether or not an increasing slippage is being exhibited in the two rear wheels, when an increasing speed is noted in one the rear wheels, judgement is rendered as to whether or not an increasing slippage is being exhibited in the two front wheels;

and, based on the results of these decisions, a judgement is rendered as to whether or not the speed increase in the wheel which was judged by the first judging means is arising due to the disproportionate effect of the drive system.

In other words, in the first and second judging means, when a judgement is rendered that the front wheel is showing a speed increase and, additionally, when the rear wheels of the same vehicle have been judged to show an increasing slippage, it is inferred that the speed increase in the front wheel arises from the disproportionate effect of the drive system, and the hydraulic brake pressure of the aforementioned front wheel is set to the hydraulic pressure reduction mode or the hydraulic pressure holding mode, without being set to the hydraulic pressure increase mode.

Moreover, in the same manner, when the rear wheel shows an increasing speed and, additionally, when a judgement has been rendered that the front wheels of the same vehicle are showing an increasing slippage, this speed increase in the rear wheel is inferred to arise from the disproportionate effect of the drive system and, with respect to the first setting means, the hydraulic break pressure mode of the rear wheel is set to the hydraulic pressure reduction mode or the hydraulic pressure holding mode, without being set to the hydraulic pressure increase mode.

Accordingly, in the anti-skid control apparatus for vehicle braking system shown in the present invention, it is possible to ascertain whether or not the increase in the speed of the front or rear wheels generated at the time of applying control is a temporary phenomena arising due to the disproportionate effect of the drive system. And, in the case where the increase in the speed of the wheels of the vehicle does arise due to the disproportionate effect of the drive system, the brake pressure mode of the vehicle can be set to the hydraulic pressure reduction mode or the hydraulic pressure holding mode, without being set to the hydraulic pressure increase mode. As a result, a vehicle wheel exhibiting the aforementioned speed increase does not go into a deep slippage (wheel lock) and accordingly, it becomes possible to operate the vehicle is a stable and safe manner.

BRIEF DESCRIPTION OF THE DRAWINGS

FIG. 5 comprises graph (a) showing the speed of the front and rear wheels, graph (b) showing the brake pressure with respect to the front and rear wheels in the prior art, graph (c) showing the speed of the front and rear wheels and graph (d) showing the brake pressure with respect to the front and rear wheels in the present invention.

DETAILED DESCRIPTION OF THE PREFERRED EMBODIMENTS OF THE PRESENT INVENTION

As a first embodiment of the present invention, a detailed description of the structure of an anti-skid control apparatus for vehicle braking system applicable for use in a 4-wheel drive vehicle will be given below in reference to FIGS. 1–8.

Figure 1:
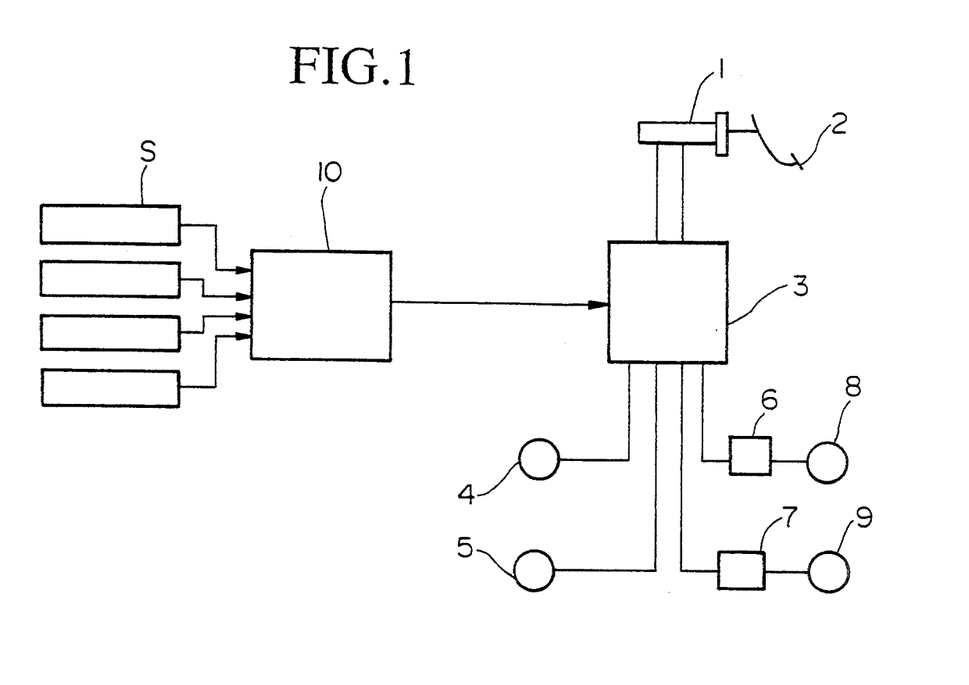
FIG. 1 is a piping diagram showing a hydraulic brake system for supplying brake fluid to the oil cylinder of a brake.
Figure 2:
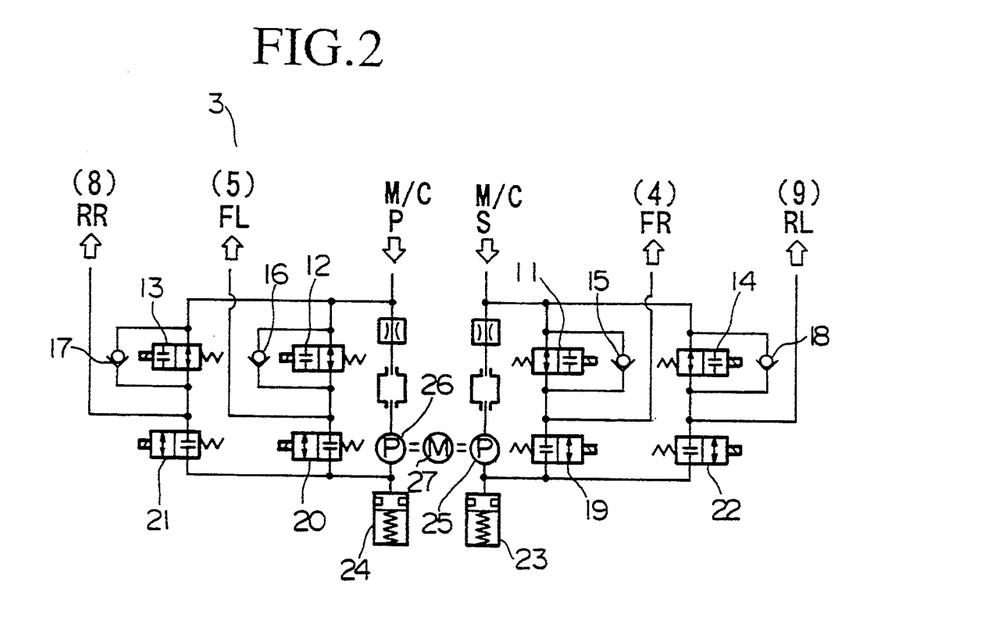
FIG. 2 is a piping diagram showing the concrete structure of the modulator show in FIG. 1.

First the complete structure of the anti-skid control apparatus for vehicle braking system according to FIGS. 1 and 2 will be explained.

Numeral 1 indicates the master cylinder. This master cylinder 1 generates hydraulic brake pressure according to the degree of pressure applied to brake pedal 2.

The hydraulic brake pressure generated by master cylinder 1 is supplied to oil cylinders 4,5 of the left and right front wheels via modulator 3 while at the same time being supplied to the oil cylinders 8,9 of the left and right rear wheels via hydraulic pressure control valve 6,7.

Modulator 3 is provided at a midway point in respective pipes extending from master cylinder 1 to each oil cylinder 4,5 and 8,9. The increase in the hydraulic brake pressure is regulated by the control signal supplied by controller 10. Furthermore, modulator 3 possesses a function to restore the hydraulic brake pressure.

A detailed description of the modulator follows below. Furthermore, a wheel speed sensor S is provided to each wheel of the vehicle for detecting the peripheral speed thereof. The wheel speed data output by these wheel speed sensors S is supplied to controller 10.

In controller 10, based on the wheel speed data, a determination is made as to whether or not the wheels are slipping and, if so, what the degree of this slippage is. Based on the calculated results, fixed skid control is carried out with respect to modulator 3 (refer to the flow charts of FIGS. 3, 4, 7, and 8).

Next, a concrete explanation of the aforementioned modulator 3 will be given through reference to FIG. 2.

Numerals 11–14 indicate change-over electro magnetic valves which can be changed from either an open or shut position. The pipe system extending from master cylinder 1 to each oil cylinder 4,5 and 8,9 can be respectively opened or shut by change-over electro magnetic valves 11–14. Furthermore, check valves 15–18 respectively are supplied to change over electro magnetic valves 11–14. When change-over electro magnetic valves 11–14 are in a shut position, said check valves 15–18 permit the respective flow of fluid in the direction of master cylinder 1.

Moreover, change-over valves 19–22 are attached in a position so as to be in parallel with change-over electro magnetic valves 11–14. Change-over valves 19–22 are opened or shut according to the control signal supplied from controller 10. As a result, the brake fluid within oil cylinders 4,5 and 8,9 is expelled to reservoirs 23,24 respectively.

Numerals 25,26 indicate the pumps driven by motor 27. Pumps 25,26 are driven according to the control signal supplied from controller 10 and the hydraulic brake pressure of the pipe system, which was reduced when anti-skid control was applied, is restored.

Further, according to the above structure, in the system for each pipe which extends from master cylinder 1 to oil cylinders 4,5 and 8,9, (a) a hydraulic pressure increase mode in which change-over electro magnetic valves 11–14 are open and change-over valves 19–22 are shut, (b) a hydraulic pressure decrease mode in which change-over electro magnetic valves 11–14 are shut and change-over valves 19–22 are open, and (c) a hydraulic pressure holding mode in which both change-over electro magnetic valves 11–14 and change-over valves 19–22 are shut, are provided. One is set from among these and the fluid flow in the pipe paths between master cylinder 1 and each of oil cylinders 4,5 and 8,9 is controlled.

In a so comprised modulator 3, when the operator steps on the brake pedal, due to the application of the brakes, the hydraulic pressure increase mode is set and the brake pressure is increased by the supply of brake fluid to each of the oil cylinders 4,5 and 8,9. However, in the event that at this time the wheels begin to slip, control 10 carries out anti-skid control. Based on the signal supplied by the speed sensor S of each wheel, modulator 3 switches the setting from the hydraulic pressure increase mode to, for example, the hydraulic pressure reduction mode or the hydraulic pressure holding mode.

Next, each step in the control action of the hydraulic brake at the time of slipping will be explained with reference to the flow charts of FIGS. 3 and 4. These flow charts are actualizations for each wheel of a vehicle.

In the following explanation, wheel velocity v, wheel deceleration $-A_{wheel}$, and slip rate s, which are utilized as judgement data as disclosed above, are computed based on the wheel speed data output respectively by wheel speed sensors S.

In the following explanation, the expression "wheel deceleration" indicates the negative acceleration of a wheel or a minus value for $A_{wheel}$, i.e., $-A_{wheel}(>0)$.

The decreasing speed of the wheel $-A_{wheel}$, the wheel deceleration threshold values (a, b, d, f and h), the slip rate threshold values (c, e, g, i) and the control contents shown in the following flow charts (please refer to FIGS. 3 and 4) are pre-stored in memory.

Step 1

Figure 6:
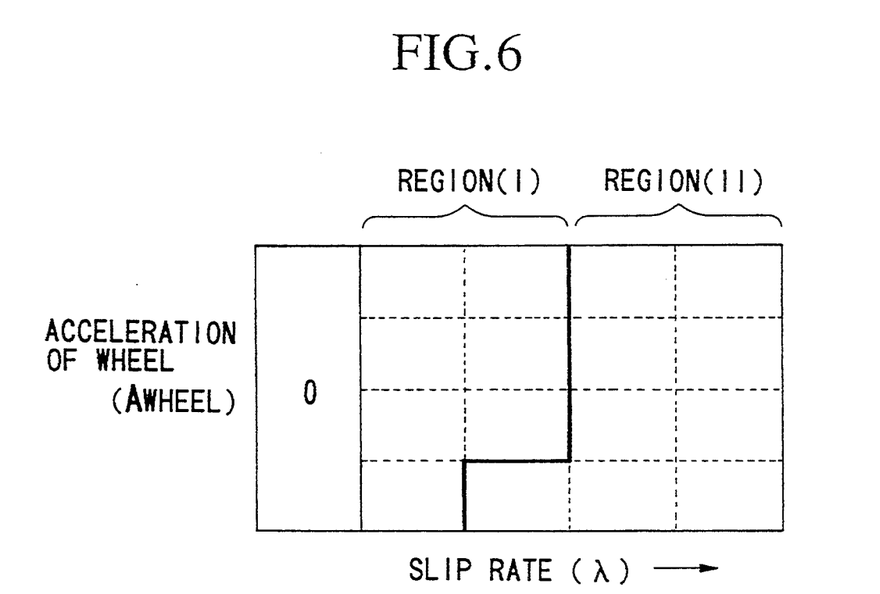
FIG. 6 is a table for the judgement in step 1 based on the degree of deceleration of the vehicle wheels and the slide rate.

Following application of the brake by the operator, judgement, utilizing for example the parameters outlined in FIG. 6, is rendered as to whether or not a slip to the extent that an immediate reduction in break pressure is necessary is occurring; in other words, judgement is rendered as to whether or not an unstable condition has arisen, is judged In the case where, through this process, a judgement of "YES" is reached, the system proceeds to steps 2–8, and the hydraulic pressure reduction mode or the hydraulic pressure holding mode is set in modulator 3. In the case where a judgement of "NO" is reached, the system proceeds to step 100, and the setting of one of either the hydraulic pressure increase mode, the hydraulic pressure reduction mode or the hydraulic pressure holding mode is performed.

Concretely, in controller 10,
(1) based on the signals received from each wheel speed sensor S, the peripheral speed of the wheel, Rω, and the acceleration, A wheel, which is the derivative of the velocity of the wheel Rω, are computed (however, a negative value is yielded for deceleration);
(2) based on the signals received from each wheel speed sensor S, the peripheral speed of the wheel Rω is computed; additionally, based on the changing curve of the peripheral speed of the wheel Rω, a simulation velocity V which is the velocity of the vehicle body is obtained, and further, the slip rate λ is calculated from the simulation velocity V and the peripheral velocity of the wheel Rω;
(3) from the wheel acceleration $A_{wheel}$ and the slip rate λ calculated in the above (1) and (2), a judgement is rendered as to whether the state of the vehicle corresponds to either of the regions (region I or region II) of the table shown in FIG. 6.

Based on the table in FIG. 6, when a decision is rendered that the acceleration of the wheel $A_{wheel}$ and the slip rate λ are within region II, the system proceeds to step 2. When a judgement is rendered that the acceleration of the wheel $A_{wheel}$ and the slip rate, λ, are within region I, the system proceeds to step 100.

The judgement of whether or not a condition of slipping has arisen is carried out on each wheel in reference to the table in FIG. 6.

Step 2

Sets the ABS (anti-lock brake system) flag which indicates that an ABS mode has been entered Step 5, Step 7

When a decision that a slip to the extent that a reduction in brake pressure is necessary is reached in step 1, a judgement is rendered in step 5 as to whether or not, for example, the deceleration of the wheel $-A_{wheel}$ is below a set value. Depending on this, a judgement is rendered as to whether or not the vehicle wheels are in a state of slip recovery.

Further, when this judgement yields a decision of NO, indicating that slip recovery is not underway, the system proceeds to step 7 and the hydraulic pressure reduction mode is set. If instead the judgement yields a decision of YES, the system proceeds to step 6.

Step 6, Step 8

If, for example, a decision of YES is reached when a judgement is made as to whether or not the slip rate or extent of slip is below a certain value and whether or not the deceleration of the wheel $-A_{wheel}$ is above 0, slip recovery is judged to be underway and the system returns to the original step 1. When a decision of NO is reached, slip recovery is judged to be not yet underway, the system proceeds to step 8 and the hydraulic pressure holding mode is set.

in the case where a slip recovery is judged to be underway in the present step 6 the system proceeds to the next step 1,100.

Step 100

Based on the deceleration of the wheel $-A_{wheel}$, modulator 3 is set to either the hydraulic pressure reduction mode, the hydraulic holding mode or the hydraulic pressure increase mode. Additionally, step 100 shows all steps 10–34 of the flow chart shown in FIG. 4.

Next, an explanation will be given of the graphs of FIG. 5(c) and 5(d) which show brake pressure and vehicle deceleration controlled according to the flow chart in FIG. 4 which is a actualization of step 100 of FIG. 3.

Step 10

A judgement is rendered as to whether the speed of each wheel is increasing or decreasing. When the speed is increasing ($\geq 0$), the system proceeds to step 14, while in the case of a decreasing speed ($<0$), the system proceeds to step 11.

Step 11

In a continuation of step 10, a judgement is rendered as to whether $-A_{wheel}$, indicating the deceleration of the wheel, has become large, exceeding a "vehicle deceleration threshold value a". In the case where a decision of YES, indicating that this threshold value has been exceeded, is reached ($-A_{wheel} \geq a$), the system proceeds to step 12. If a decision of NO ($-A_{wheel} < a$) is reached, indicating that the $-A_{wheel}$ has not exceeded "vehicle deceleration threshold value a", the system proceeds to step 14.

To restate, in these steps 10 and 11, as was explained by the prior art, following operation of the brake by the vehicle operator, detection is made of a temporary increase in speed in one of the front wheels or one of the back wheels occurring due to the disproportionate effect of the drive system on each of the wheels (the phenomena arising due to the rebound of a drive system which has been activated).

Additionally, to state concretely, the aforementioned "vehicle deceleration threshold value a" is 1.5 m/sec$^2$.

Step 12

In this step brake pressure is held when a judgement is rendered in step 11 that $-A_{wheel}$, indicating the deceleration of the vehicle wheel, has become large, exceeding the vehicle deceleration threshold value a, i.e., in the case where a slip in the vehicle wheels has been detected. As a result, modulator 3 is set to the hydraulic pressure holding mode.

Step 14

In step 14, when a judgement is rendered in steps 10 and 11 that the wheel for which data processing is being carried out is exhibiting a temporary speed increase, a judgement is rendered as to whether the wheel on which data processing is being performed is a front wheel or a rear wheel.

Furthermore, when a judgement is made that it is the rear wheel on which data processing is being carried out, the system proceeds from steps 15 on (step set 40) and the two front wheels are checked for slipping or not. Moreover, when a judgement is reached that it is the front wheel on which data processing is being carried out, the system proceeds from steps 24 on (step set 50) and the two rear wheels are checked for slipping or not.

In the step set 40 below, when a judgement is rendered that the two front wheels are slipping, the speed increase of the rear wheel is judged to be a temporary phenomena generated due to the disproportionate effect of the drive system, and the brake pressure mode of the rear wheel is set to the hydraulic pressure reduction mode or the hydraulic pressure holding mode, without being set to the hydraulic pressure increase mode. In the same manner, in the step set 50 below, when the two rear wheels are judged to be exhibiting increased slipping, the speed increase of the front wheel is judged to be a temporary phenomena due to the disproportionate effect of the drive system, and the brake pressure mode of the front wheel is set to the hydraulic pressure reduction mode or the hydraulic pressure holding mode, without being set to the hydraulic pressure increase mode.

Step 15

Judgement is carried out for both front wheels as to whether or not their respective $-A_{wheel}$, values, which show the deceleration of the vehicle wheel, exceed the vehicle deceleration threshold value b.

When this judgement yields a decision of YES, i.e., both front wheels are exhibiting increasing slippage, the system proceeds to step 22, the velocity increase of the rear wheel is judged to be the effect of the disproportionate action of the drive system and the hydraulic pressure reduction mode which reduces the brake pressure of the rear wheel is set in modulator 3.

When a decision of NO is reached in this step, the system proceeds to the following step 16.

Step 16

Judgement is rendered for both front wheels as to whether or not the slip ratio or the extent of the slip which is calculated from the wheel speed and the simulated vehicle speed exceeds a preset "slip rate threshold value c". When this result yields a YES, namely that the front two wheels are showing increasing slippage, the system proceeds to step 22 and, in the same manner as in step 15, the speed increase in the rear wheel is judged to be the result of the disproportionate effect of the drive system and the hydraulic pressure reduction mode which reduces the brake pressure of the rear wheel is set in modulator 3.

When a decision of NO is reached in this step, the system proceeds to the following step 17.

Step 17

A judgement is rendered for one of the front wheels as to whether $-A_{wheel}$, which shows the deceleration of the vehicle, is above the vehicle deceleration threshold value b or not; for the other front wheel a judgement is rendered as to whether the slip rate which is calculated from the wheel speed and the simulated vehicle speed is above a preset slip rate threshold value c or not.

When $-A_{wheel}$ is above the vehicle deceleration threshold value b and the slip rate is above a preset slip rate threshold value c, both front wheels are judged to be exhibiting increasing slippage and the system proceeds to step 22.

In step 17, in the same manner as in step 15, when a decision of YES is yielded, the speed increase of the rear wheel is judged to an effect of the disproportionate action of the drive system, the system proceeds to step 22 below, and the hydraulic pressure reduction mode which reduces the brake pressure is set in modulator 3.

When a decision of NO is reached in step 17, the system proceeds to the following step 18.

Step 18

For both of the front wheels, a judgement is rendered as to whether or not $-A_{wheel}$, which shows the deceleration of the vehicle, is above a "vehicle deceleration threshold value d" indicating that a condition of increasing slippage is present.

When a decision of YES is reached, the front two wheels are judged to be exhibiting an increasing slippage, the speed increase of the rear wheel is judged to be an effect of the disproportionate action of the drive system, and the system proceeds to step 23 below. In step 23, the hydraulic pressure holding mode which holds the brake pressure of the rear wheel is set to modulator 23.

Further, when a decision of NO is reached in step 18, the system proceeds to the following step 19.

The "wheel deceleration threshold value d" disclosed above is less than the aforementioned "wheel deceleration threshold value b":

$$b > d$$

Step 19

A judgement is rendered on both front wheels as to whether or not the slip rate, which was calculated from the wheel speed and the simulated vehicle speed, is above a preset "slip rate threshold value e".

When this judgement yields a decision of YES, the two front wheels are judged to be in a state of increasing slippage, the speed increase of the rear wheel is judged to be an effect of the disproportionate action of the drive system, and the system proceeds to step 23 below. In step 23, in the same manner as in step 18, the hydraulic pressure holding mode which holds the brake pressure of the rear wheel is set in modulator 23.

When a decision of NO is reached in step 19, the system proceeds to the following step 20.

The "slip rate threshold value e" disclosed above is less than the aforementioned "slip rate threshold value c":

$$c > e$$

Step 20

For one of the front wheels, a judgement is rendered as to whether $-A_{wheel}$, which shows the deceleration of the wheel, is above the vehicle deceleration threshold value d or not, and for the other front wheel, whether the slip rate which is calculated from the wheel speed and the simulated vehicle speed is above a preset slip rate threshold value e or not.

In this step, when the deceleration of the wheel $-A_{wheel}$ is above the wheel deceleration threshold value d and the slip rate is above a preset slip rate threshold value e, both front wheels are judged to be exhibiting increased slippage, the speed increase of the rear wheels is judged to be an effect of the disproportionate action of the drive system and the system proceeds to step 23.

In step 23, in the same manner as in step 18, the hydraulic pressure holding mode which holds the brake pressure of the rear wheel is set to modulator 3.

When the judgement yields a decision of NO in step 20, the system proceeds to step 30 below.

Step 22

Please refer to the explanations for steps 15–17.

Step 23

Please refer to the explanations for steps 18–20

Step 24–Step29

When a decision is rendered in step 14 that data processing for the rear wheel of a vehicle is being carried out, the system proceeds to steps 15–20. Further, while a decision as to whether or not the front two wheels are exhibiting increasing slippage is carried out in steps 15–20, when a decision is reached in step 14 that data processing on the front wheel is being performed (i.e., when a decision is made that the front wheel is showing an increasing speed), the system proceeds to steps 24–29. In steps 24–29 a judgement is rendered as to whether or not there is an increasing slippage in the rear two wheels.

Further, the processing contents of steps 24–29 are essentially identical to those of the aforementioned steps 15–20, and so accordingly a detailed description of them will be omitted.

Moreover, when a judgement of NO is reached in step 29, in the same manner as in step 20, the system proceeds to step 30.

Step 30

When the speed increase in the rear wheel is judged in steps 15–20 to not be an effect of the disproportionate action of the drive system during front wheels processing (all steps 15–20 are NO) and when the speed increase of the front wheel is judged in steps 24–29 to not be an effect of the disproportionate action of the drive system during rear wheels processing (all steps 24–29 are NO), in the present step 30 judgement is rendered as to whether or not the ABS flag (set in step 2) is set, in other words, whether or not the wheel in which the speed increase is judged is in the ABS mode.

Further, in the present step 30 when a decision of NO is reached, the system proceeds to step 31 while when a decision of YES is reached the system proceeds to step 32.

Step 31

Normal hydraulic brake pressure increase (wherein the master cylinder and the oil brake are connected) is carried out, i.e., the brake pressure is continually increased.

When the present step 31 has been arrived at via steps 15–20, brake pressure is continually increased to the rear wheel; if instead the present step 31 has been arrived at via steps 24–29 brake pressure is continually increased to the front wheel.

Figure 3:
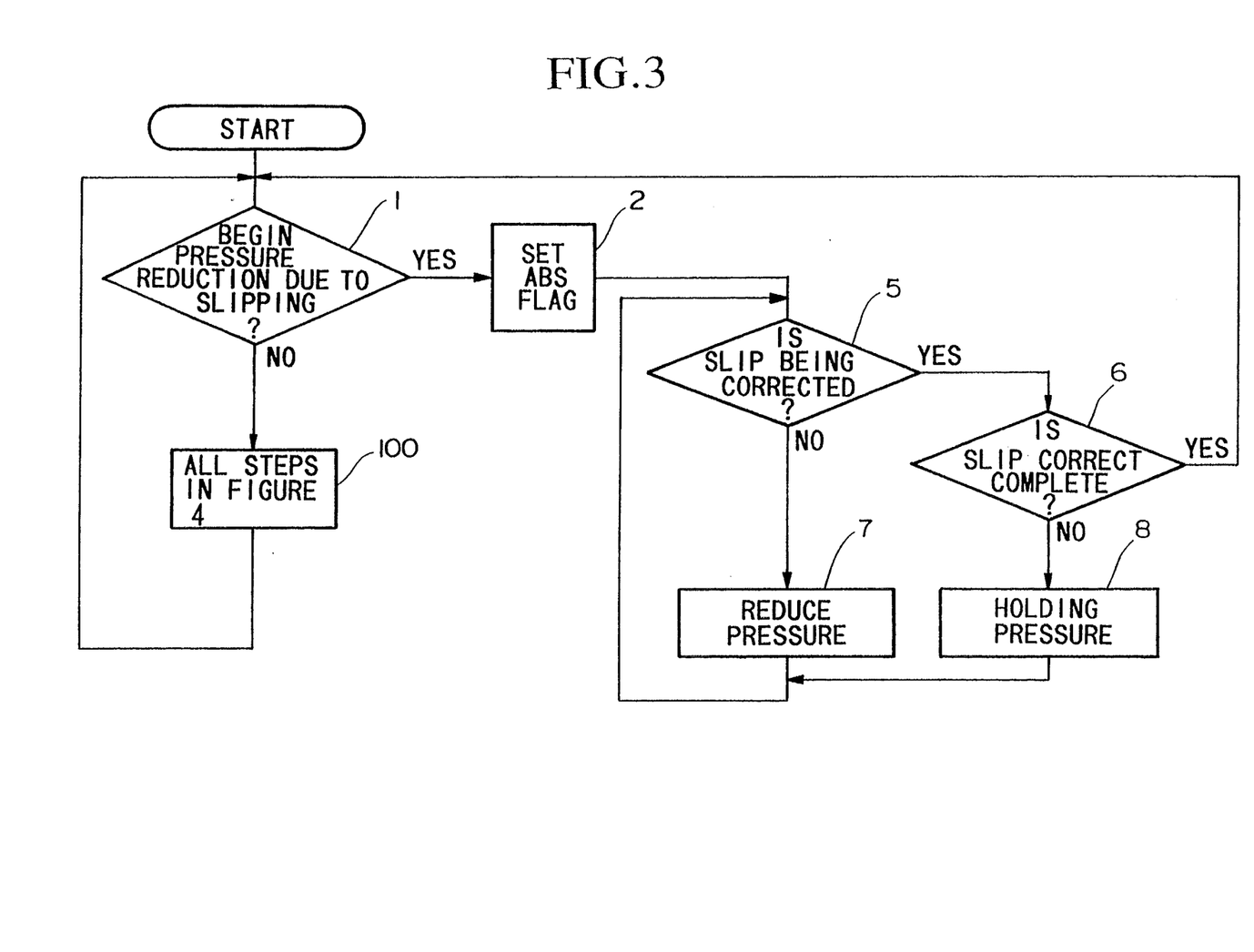
FIG. 3 is a flow chart for the control of the modulator.
Figure 4:
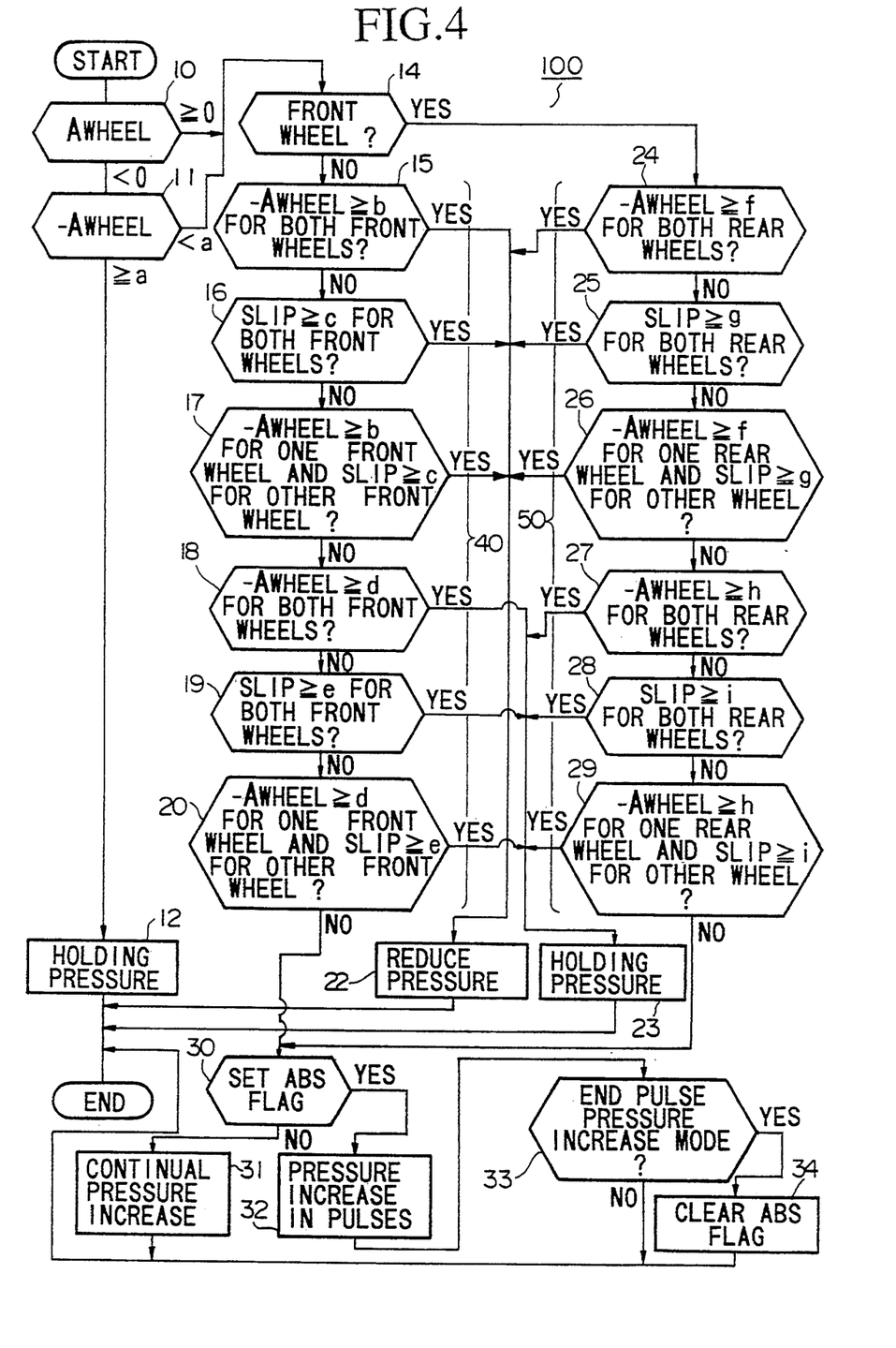
FIG. 4 is a flow chart showing in detail step 100 of the flow chart in FIG. 3.
Figure 5D:
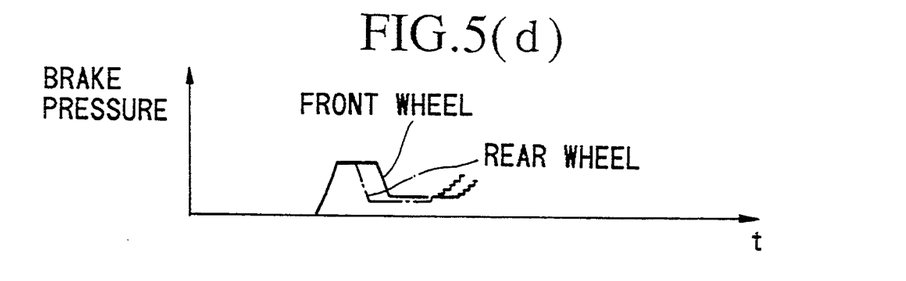

When step 31 terminates, the process flow as shown in FIG. 4 is terminated and the system returns to step 1 shown in FIG. 3.

Step 32

Due to the intermittent action of an electromagnetic valve, a pulsing hydraulic pressure increase mode, which increases the brake pressure in phases, is set in modulator 3.

When step 32 was arrived at via steps 15–20, brake pressure is increased in pulses to the rear wheel; if instead step 32 was arrived at via steps 24–29, brake pressure is increased in pulses to the front wheel.

Step 33

Judgement is rendered as to whether or not the pressure increase which increases the brake pressure in pulses in step 32 has been carried out without interruption for a set time period. When a decision of NO is rendered the path in FIG. 4 is brought to an end and step 1 of FIG. 3 is returned to. If YES, then the system proceeds to the following step 34.

Step 34

The ABS flag set in step 2 of FIG. 3 is cleared and, as a result, the ABS mode is cancelled.

When step 34 comes to an end, the path shown in FIG. 4 terminates and the system returns to step 1 shown in FIG. 3.

The vehicle deceleration threshold values f and h shown in the aforementioned steps 24, 26, 27 and 29 have the following relationship:

$$f > h$$

The vehicle deceleration threshold value f,h may have the following relationship to the vehicle deceleration threshold values b,d shown in steps 15, 17, 18, and 20:

$$f = b, \ h = d$$

Further, the slip rate thresholds g and i shown in steps 25, 26, 28, and 29 have the following relationship:

$$g > i$$

The slip rate threshold values g, i may have the following relationship to the slip rate threshold values c,e shown in steps 16, 17, 19, and 20:

$$c = g, \ i = e$$

In the preferred embodiments the vehicle deceleration threshold values and the slip rate threshold values are set so as to be related in the following manner: $b > d$, $c > e$, $f > h$, and $g > i$. However, the respective threshold values are not limited to the preceding relationships and may be varied as is appropriate to the specific features of a given vehicle.

Additionally, according to the characteristics of a given vehicle, it is also permissible to carry out step set 40 only, omitting step set 50 or vise-versa. Steps 15–17 in step set 40 may be omitted and, further, steps 24–26 in step set 50 may be omitted.

Moreover, steps 16, 17, 19, and 20 in step set 40 may be omitted and steps 25, 26, 28 and 29 may be omitted in step set 50.

In other words, either of steps 15–20 or steps 24–29 may be used in order to render a decision as to whether or not the vehicle wheel is showing an increasing slippage.

The set values of the wheel acceleration threshold values a, b, d, f and h and the slip rate threshold values c, e, g and i may be varied respectively as to whether the ABS flag is set or not set in step 2.

In the flow chart of FIG. 4, steps 10 and 11 correspond to a "first judging means". Step set 40 (step 15–step 20 and step set 50 (step 24–step 29) correspond to a "second judging means". Step 22 and step 23 correspond to a "first setting means".

In the flow chart of FIG. 3, step 1 corresponds to a "slip detection means"; step 5–step 8 correspond to a "second setting means".

In the flow chart of FIG. 4, step 10 and step 11 correspond to a "acceleration judging means". Step set 40 (step 15–step 20) and step set 50 (step 24–step 29) correspond to a "slip judging means". Step 22, step 23 and steps 30–34 correspond to a "hydraulic pressure increase mode inhibiting means".

The above embodiment shows an example of an anti-skid device for installation in a 4-wheel drive vehicle. However, in the case where the 4-wheel drive vehicle is a front engine type, steps 14–20 may be omitted. To restate, for the case where the 4-wheel drive vehicle is a front-engine one, a judgement is rendered in step 14 as to whether or not the acceleration of one of the front wheels is increasing and, for a judgement of YES, the system proceeds to step 24, while for a judgement of NO, the system proceeds to step 30.

Moreover, provided that is is possible to gradually reduce the brake pressure supplied to oil cylinders 4, 5, 8 and 9, the hydraulic pressure reduction mode may be set in step 23 without setting the hydraulic pressure holding mode. Depending upon the numerical value of the threshold values b, c, d, e, f, g, h, and i utilized in step set 40 and step set 50, step 23 may be omitted.

Furthermore, in modulator 10, the peripheral speed of the wheel $R\omega$ is calculated based on the signal supplied from each wheel sensor. Based on the variation curve of the peripheral speed of the wheel $R\omega$, the simulation velocity V, which is the velocity of the vehicle body, is obtained. Furthermore, although the slip rate λ is calculated from the simulation velocity V and the peripheral speed of the wheel $R\omega$, there is no limitation implied in this; the extent of slippage may be calculated as well from the simulation velocity V and the peripheral speed of the wheel $R\omega$ and, based on this slip quantity, the judgements made in steps 16, 17, 19 and 20 and steps 25, 26, 28 and 29 may be performed.

Variation on the Embodiments

Steps 3–4 and step 100 may be added to the flow chart shown in FIGS. 3 and 4.

Figure 7:
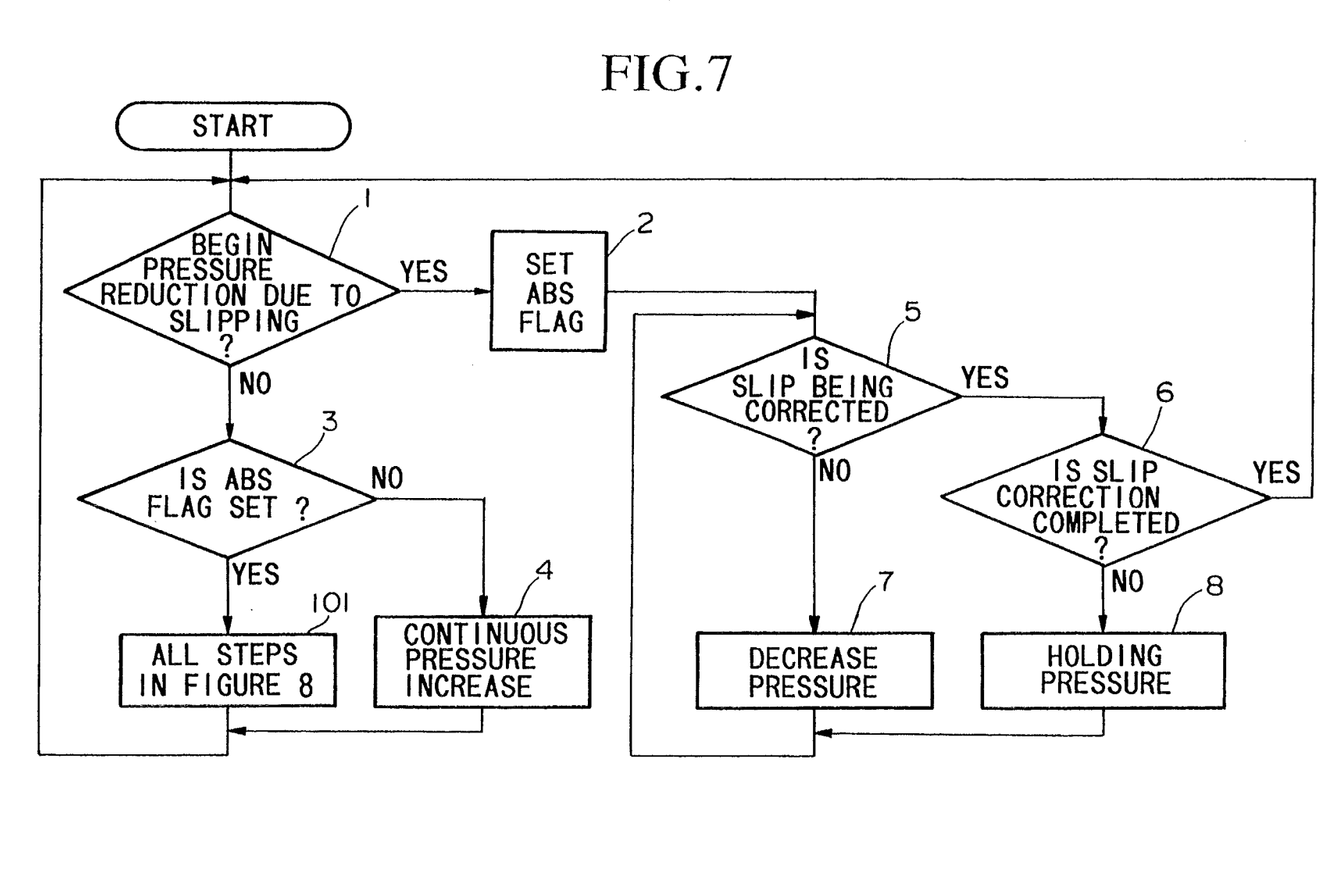
FIG. 7 is a flow chart showing a variation on FIG. 3.
Figure 8:
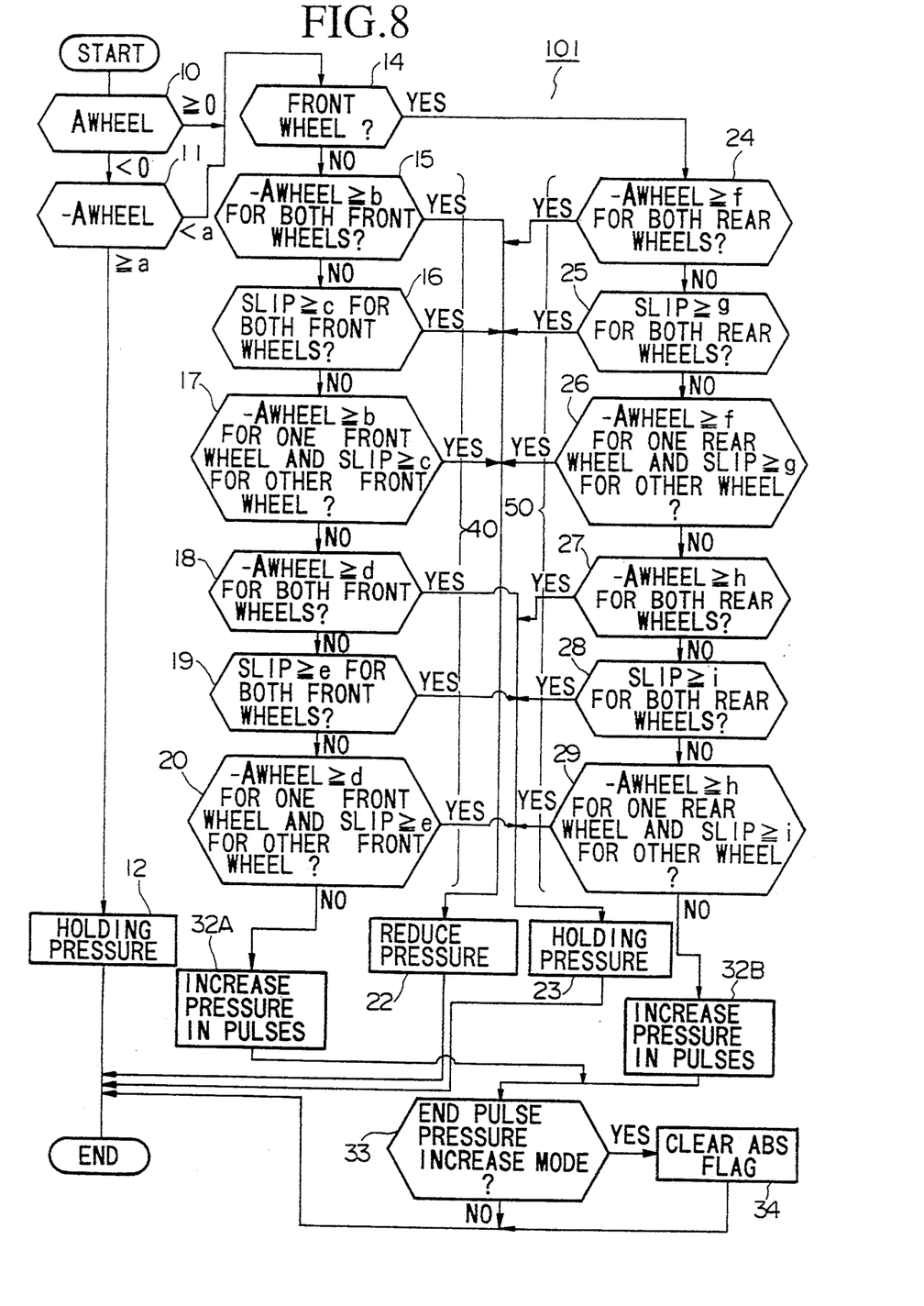
FIG. 8 is a flow chart showing in detail step 101 of FIG. 7.

Namely, as is shown by steps 3–4 and step 100 in FIGS. 7 and 8, the temporary speed increase in the front wheel or the back wheel is detected only in the case where an anti-skid mode has been entered. Further, when the temporary speed increase is generated due to the disproportionate effect of the drive system, the aforementioned brake pressure of the vehicle wheel may be held or reduced.

An explanation follows of the points of difference between FIGS. 7 and 8 and FIGS. 3 and 4.

Step 3

A judgement is rendered as to whether or not the ABS (anti-lock brake system)is set, i.e. whether or not the vehicle is in an ABS mode. If YES, the system proceeds to step 101.

Step 4

The brake pressure is increased to modulator 3 (the condition wherein the master cylinder and the oil brake are connected). In other words, following a continuous increase in brake pressure, the system returns to the original step 1.

Step 101

Based in the deceleration of the wheel $-A_{wheel}$, modulator 3 is set to one of either the hydraulic pressure reduction mode, the hydraulic pressure holding mode or the hydraulic pressure increase mode.

The present step 100 shows all of steps 10–34 of the flow chart shown in FIG. 8.

Step 100 is carried out only when the vehicle enters an anti-skid condition following the application of the brake by the operator.

Step 32A

In steps 15–20, when a judgement is made that the speed increase in the rear wheel is not generated due to the disproportionate effect of the drive system (when all of steps 15–20 are NO), in the present step 32A an electromagnetic valve is intermittently operated and, as a result, modulator 3 is set to a hydraulic pressure increase pulse mode wherein the brake pressure to the rear wheel is increased in phases.

Step 32B

In steps 24–29, when a judgement is made that the speed increase in the front wheel is not generated due to the disproportionate effect of the drive system (when all of steps 24–29 are NO), in the present step 32B an electromagnetic valve is intermittently operated and, as a result, modulator 3 is set to a hydraulic pressure increase pulse mode wherein the brake pressure to the front wheel is increased in phases.

In an anti-skid device of this type which carries out the control shown in FIGS. 7 and 8, when the vehicle is not in an anti-skid condition, the system proceeds directly to step 4 and brake pressure is continually increased. As a result, the judgements shown in steps 10, 11, 14–20 and 24–29 which were carried out in FIG. 4 are omitted and step 31 (i.e., step 4)is directly proceeded to, making possible a reduction in processing time.

What is claimed is:

1. An anti-skid control apparatus for a braking system of a vehicle having left and right front wheels and left and right rear wheels, the braking system comprising:

an adjustable modulator, for increasing a hydraulic pressure to oil cylinders of the left and right, and front and rear four wheels of the vehicle in a hydraulic pressure increase mode, holding as is the current value of the hydraulic brake pressure in a hydraulic pressure holding mode, and for reducing the hydraulic brake pressure to the oil cylinder of said left and right, and said front and rear four wheels of said vehicle in a hydraulic pressure reduction mode;

a detection means for detecting the speed of said left and right, and said front and rear four wheels of said vehicle;

a slip detection means for judging by evaluating signal outputs from said detection means whether or not a slip of the extent to which anti-skid control is necessary has been generated in any of the four front, rear, left and right wheels of said vehicle, a controller which controls said modulator based on the judged result of said slip detection means, and which selects and sets one of said hydraulic pressure increase mode, said hydraulic pressure holding mode and said hydraulic pressure reduction mode for said each wheel; wherein said controller is equipped with;

an anti-skid control setting means for setting an anti-skid control for the wheel the slip detection means judged that the anti-skid control is necessary;

a hydraulic pressure control means for setting said adjustable modulator at either the pressure maintaining mode or the pressure reduction mode with regard to the wheel for which the anti-skid control has been set by said anti-skid control setting means until the slipping which triggered the anti-skid control disappears, and, when the slipping disappears, for setting the adjustable modulator at the pressure increase mode in condition that the wheel speed of the wheel is increasing; and a pressure increase restriction means for determining whether slip is increasing at the pair of front or rear wheels to which the wheel the pressure increase mode is set does not belong, and converting the pressure increase mode to either the pressure maintaining mode or the pressure decrease mode if the slip at the pair of front or rear wheels is increasing.

2. An anti-skid control apparatus for a braking system of a four-wheel drive vehicle having left and right front wheels and left and right rear wheels, the braking system comprising, an adjustable modulator, said adjustable modulator being provided with a hydraulic pressure increase mode for increasing the hydraulic pressure to the oil cylinders of the left and right, and front and rear four wheels of a vehicle, a hydraulic pressure holding mode for holding as is the current value of the hydraulic brake pressure, and with a hydraulic pressure reduction mode for reducing the hydraulic brake pressure to the oil cylinder of said left and right, and said front and rear four wheels of said vehicle;

a detecting means for detecting respectively the speeds of said four front, rear, left and right wheels of said vehicle;

a slip detection means for judging by evaluating signal outputs from said detection means whether or not a slip of the extent to which anti-skid control is necessary has been generated in any of the four front, rear, left and right wheels of said vehicle;

a controller for controlling the modulator based on the judged result of said slip detection means, and for selecting and setting each said wheel to one of said hydraulic pressure increase mode, said hydraulic pressure holding mode and said hydraulic pressure reduction mode; said controller having;

an anti-skid control setting means for setting an anti-skid control for the wheel the slip detection means judged that the anti-skid control is necessary;

a hydraulic pressure control means for setting said adjustable modulator at either the pressure maintaining mode or the pressure reduction mode with regard to the wheel for which the anti-skid control has been set by said anti-skid control setting means until the slipping which triggered the anti-skid control disappears, and, when the slipping disappears, for setting the adjustable modulator at the pressure increase mode in condition that the wheel speed of the wheel is increasing; and a pressure increase restriction means for determining whether slip is increasing at the pair of front or rear wheels to which the wheel the pressure increase mode is set does not belong, and converting the pressure increase mode to either the pressure maintaining mode or the pressure decrease mode if the sip at the pair of front or rear wheels is increasing.

3. An anti-skid control apparatus for vehicle braking system according to claim 2 wherein said speed detecting means determines whether or not the speed of one of said front wheels is increasing, said slip detection means determines whether or not said rear wheels are exhibiting increasing slippage, and wherein, when one of said front wheels has been determined by said speed detecting means to be increasing in speed and when the pair of two rear wheels has been determined by said slip detecting means to be exhibiting increasing slippage, said pressure increase restriction means is provided with said modulator for setting said hydraulic pressure increase mode in said wheel which has been judged by said speed judging means to be increasing in speed.

* * * * *